United States Patent
Chen

(10) Patent No.: US 11,556,178 B2
(45) Date of Patent: Jan. 17, 2023

(54) HAPTIC FEEDBACK METHOD AND APPARATUS, AND NON-TRANSITORY COMPUTER STORAGE MEDIUM

(71) Applicant: BOE TECHNOLOGY GROUP CO., LTD., Beijing (CN)

(72) Inventor: Yuju Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/333,445

(22) Filed: May 28, 2021

(65) Prior Publication Data

US 2022/0129073 A1   Apr. 28, 2022

(30) Foreign Application Priority Data

Oct. 28, 2020 (CN) .......................... 202011173952.5

(51) Int. Cl.
   *G06F 3/041* (2006.01)
   *G06F 3/01* (2006.01)

(52) U.S. Cl.
   CPC .............. *G06F 3/016* (2013.01); *G06F 3/041* (2013.01)

(58) Field of Classification Search
   None
   See application file for complete search history.

(56) References Cited

U.S. PATENT DOCUMENTS

| 2008/0122797 A1* | 5/2008 | Soh ......................... G06F 3/016 345/173 |
| 2011/0260998 A1* | 10/2011 | Ludwig ............... G06F 3/04166 345/173 |
| 2018/0039331 A1* | 2/2018 | Warren .................. G06F 3/043 |

\* cited by examiner

*Primary Examiner* — Carl Adams
(74) *Attorney, Agent, or Firm* — Fay Sharpe LLP

(57) ABSTRACT

A haptic feedback method includes: driving a haptic feedback film layer to switch between at least two vibration modes, wherein the at least two vibration modes include a first vibration mode and a second vibration mode, a first position is different from a second position in a first direction, and the first position is a position of a first point when the haptic feedback film layer vibrates in the first vibration mode, and the second position is a position of the first point when the haptic feedback film layer vibrates in the second vibration mode.

18 Claims, 6 Drawing Sheets

HAPTIC FEEDBACK METHOD AND APPARATUS, AND NON-TRANSITORY COMPUTER STORAGE MEDIUM

This application claims priority to Chinese Patent Application No. 202011173952.5, filed on Oct. 28, 2020 and entitled "HAPTIC FEEDBACK METHOD AND APPARATUS, AND COMPUTER STORAGE MEDIUM," the disclosure of which of which is incorporated herein by reference in its entirety.

TECHNICAL FIELD

The present disclosure relates to a haptic feedback method and apparatus, and a non-transitory computer storage medium.

BACKGROUND

A haptic feedback film layer is a device that achieves various senses of touch. Currently, when haptic feedback is performed by using a haptic feedback film layer, the haptic feedback film layer may be driven to vibrate based on a control signal. When a user touches the film layer, the friction between a finger and the film layer changes compared with the case where the film layer does not vibrate, such that the haptic feedback film layer achieves simulation of different senses of touch.

SUMMARY

Embodiments of the present disclosure provide a haptic feedback method and apparatus, and a non-transitory computer storage medium. The technical solutions are as follows.

According to a first aspect of the present disclosure, a haptic feedback method is provided. The method includes:

driving a haptic feedback film layer to switch between at least two vibration modes, wherein the at least two vibration modes include a first vibration mode and a second vibration mode, a first position is different from a second position in a first direction, the first position is a position of a first point when the haptic feedback film layer vibrates in the first vibration mode, and the second position is a position of the first point when the haptic feedback film layer vibrates in the second vibration mode, the first point is a point on the haptic feedback film layer, the first direction is a direction parallel to a reference plane, and the reference plane is a surface of the haptic feedback film layer in a flat state.

Optionally, driving the haptic feedback film layer to switch between the at least two vibration modes includes:

driving the haptic feedback film layer at a first moment to enable the haptic feedback film layer to vibrate in the first vibration mode; and driving the haptic feedback film layer at a second moment after a first time period to enable the haptic feedback film layer to vibrate in the second vibration mode, wherein the first time period is longer than or equal to a time period for enabling the haptic feedback film layer to vibrate in the first vibration mode.

Optionally, driving the haptic feedback film layer to switch between the at least two vibration modes includes:

driving the haptic feedback film layer to switch between the at least two vibration modes by taking a point of a touch body in a touch region on the haptic feedback film layer as the first point and taking a moving direction of the touch body on the reference plane as the first direction, when the touch body moves on the haptic feedback film layer.

Optionally, driving the haptic feedback film layer to switch between the at least two vibration modes includes:

driving the haptic feedback film layer to switch between the at least two vibration modes by taking a point of a touch body in a touch region on the haptic feedback film layer as the first point and taking a direction opposite to a moving direction of the touch body on the reference plane as the first direction, when the touch body moves on the haptic feedback film layer.

Optionally, the haptic feedback film layer includes a plurality of regions, and driving the haptic feedback film layer to switch between the at least two vibration modes includes:

driving at least one region in the haptic feedback film layer to switch between the at least two vibration modes.

Optionally, a moving track of the first point is a closed plane figure when the haptic feedback film layer switches between the at least two vibration modes, and a plane determined by the closed plane figure is parallel to the first direction.

Optionally, the closed plane figure is an ellipse, and a minor axis of the ellipse is parallel to the first direction.

Optionally, amplitude of the first vibration mode and amplitude of the second vibration mode are the same, and a phase difference between the first vibration mode and the second vibration mode is 90 degrees.

Optionally, driving the haptic feedback film layer to switch between the at least two vibration modes includes:

driving the haptic feedback film layer to switch between the at least two vibration modes based on a control instruction, wherein the control instruction comprises an electrical signal whose frequency varies with time, and the electrical signal has at least two frequencies in one-to-one correspondence to the at least two vibration modes of the haptic feedback film layer.

According to a second aspect of the present disclosure, a haptic feedback method is provided. The method includes:

acquiring at least two vibration modes of a haptic feedback film layer, wherein the at least two vibration modes include a first vibration mode and a second vibration mode, a first position is different from a second position in a first direction, the first position is a position of a first point when the haptic feedback film layer vibrates in the first vibration mode, and the second position is a position of the first point when the haptic feedback film layer vibrates in the second vibration mode, the first point is a point on the haptic feedback film layer, and the first direction is a direction parallel to the haptic feedback film layer in a flat state; and inputting control information to a control apparatus, wherein the control information includes information of the at least two vibration modes, and is provided for the control apparatus to control the haptic feedback film layer to switch between the at least two vibration modes.

Optionally, acquiring the at least two vibration modes of the haptic feedback film layer includes:

determining a moving track of the first point when the haptic feedback film layer switches between the at least two vibration modes, wherein the moving track is a closed plane figure, and a plane determined by the closed plane figure is parallel to the first direction; and determining the at least two vibration modes based on the moving track.

According to a third aspect of the present disclosure, a haptic feedback apparatus is provided. The apparatus includes a haptic feedback film layer, and a driving component, wherein the driving component is configured to drive a haptic feedback film layer to switch between at least two vibration modes, wherein the at least two vibration modes include a first vibration mode and a second vibration mode, a first position is different from a second position in a first direction, the first position is a position of a first point when the haptic feedback film layer vibrates in the first vibration mode, and the second position is a position of the first point when the haptic feedback film layer vibrates in the second vibration mode, the first point is a point on the haptic feedback film layer, the first direction is a direction parallel to a reference plane, and the reference plane is a surface of the haptic feedback film layer in a flat state.

Optionally, the driving component is configured to:

drive the haptic feedback film layer at a first moment to enable the haptic feedback film layer to vibrate in the first vibration mode; and drive the haptic feedback film layer at a second moment after a first time period to enable the haptic feedback film layer to vibrate in the second vibration mode, wherein the first time period is longer than or equal to a time period for enabling the haptic feedback film layer to vibrate in the first vibration mode.

Optionally, the driving component is configured to:

drive the haptic feedback film layer to switch between the at least two vibration modes by taking a point of a touch body in a touch region on the haptic feedback film layer as the first point and taking a moving direction of the touch body on the reference plane as the first direction, when the touch body moves on the haptic feedback film layer.

Optionally, the driving component is configured to:

drive the haptic feedback film layer to switch between the at least two vibration modes by taking a point of a touch body in a touch region on the haptic feedback film layer as the first point and taking a direction opposite to a moving direction of the touch body on the reference plane as the first direction, when the touch body moves on the haptic feedback film layer.

Optionally, the haptic feedback film layer includes a plurality of regions, and the driving component is configured to:

drive at least one region in the haptic feedback film layer to switch between the at least two vibration modes.

According to a fourth aspect of the present disclosure, a haptic feedback device is provided. The device includes: a haptic feedback film layer, a processor, and a memory storing a program therein, wherein the program, when loaded and executed by the processor, causes the processor to implement the haptic feedback method in the first aspect.

According to a fifth aspect of the present disclosure, a haptic feedback device is provided. The device includes: a processor, and a memory storing a program therein, wherein the program, when loaded and executed by the processor, causes the processor to implement the haptic feedback method in the second aspect.

According to a sixth aspect of the present disclosure, a non-transitory computer storage medium storing a program therein is provided. The program, when executed by a processor, causes the processor to implement the haptic feedback method in the first aspect.

According to a seventh aspect of the present disclosure, a computer program product or computer program is provided, wherein the computer program product or computer program includes a computer instruction stored in a non-transitory computer storage medium. The computer instruction, when red by a processor of a computer device from the non-transitory computer storage medium and executed by the processor, causes the computer device to implement the haptic feedback methods in the first aspect and second aspect.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Specific embodiments of the present disclosure have been shown through the above accompanying drawings, and will be described in more detail hereinafter. These accompanying drawings and textual descriptions are not intended to limit the scope of concept of the present disclosure by any means, but are intended to illustrate the concept of the present disclosure to those skilled in the art with reference to the specific embodiments.

DETAILED DESCRIPTION

The embodiments of the present disclosure will be described hereinafter with reference to the accompanying drawings.

Figure 1:
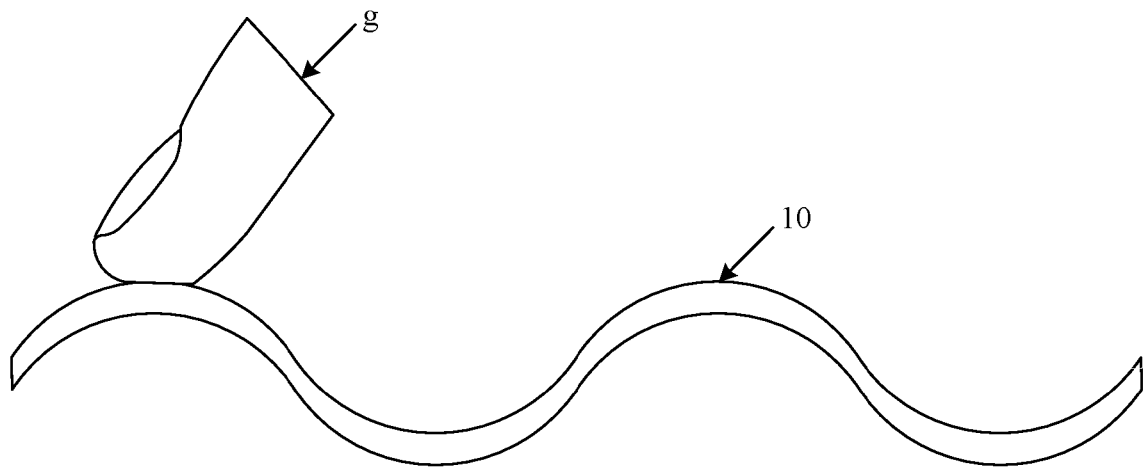
FIG. 1 is a schematic diagram of application of a haptic feedback film layer.

FIG. 1 is a schematic diagram of application of a haptic feedback film layer. The haptic feedback film layer 10 is driven to vibrate in a certain vibration mode. Since the surface of a finger g is uneven due to fingerprints, air pressures in different regions of the finger g are different after the finger g touches the vibrating haptic feedback film layer 10, such that the sense of touch felt by the finger g changes.

Figure 2:
FIG. 2 is a schematic structural diagram of a haptic feedback apparatus involved in an embodiment of the present disclosure.

FIG. 2 is a schematic structural diagram of a haptic feedback apparatus according to an embodiment of the present disclosure. The haptic feedback apparatus 20 may include a driving component 21 and a haptic feedback film layer 22. The driving component 21 may include a plurality of sheets made of piezoelectric materials, and the driving component 21 is attached to one end of the haptic feedback film layer 22.

In an exemplary embodiment of the present disclosure, the driving component 21 is a device that operates based on an inverse piezoelectric effect of the piezoelectric material.

The piezoelectric material is electropolarized under pressure, resulting in a potential difference between surfaces of two ends of the piezoelectric material in one direction. This phenomenon is called a "piezoelectric effect", and its inverse effect, namely, the phenomenon that a dielectric is elastically deformed under the drive of an electrical signal is called the "inverse piezoelectric effect" or "electrostriction". In the embodiments of the present disclosure, an electrical signal may be applied to the piezoelectric material to enable the piezoelectric material to vibrate, thereby driving the haptic feedback film layer 22 to vibrate. By controlling the electrical signal, the vibration mode of the haptic feedback film layer 22 may be adjusted, such that the haptic feedback film layer 22 can vibrate in a predetermined vibration mode.

In the embodiments of the present disclosure, the vibration mode may refer to an inherent vibration mode of an elastic body or elastic system per se. The vibration mode can be described by using relative positions of mass points in vibration, namely, a vibration curve. Since the elastic system with a plurality of mass points has a plurality of degrees of freedom, there may be a plurality of vibration modes. The haptic feedback film layer may be considered as an elastic system with a plurality of mass points, and thus the haptic feedback film layer also has a plurality of vibration modes.

Figure 3:
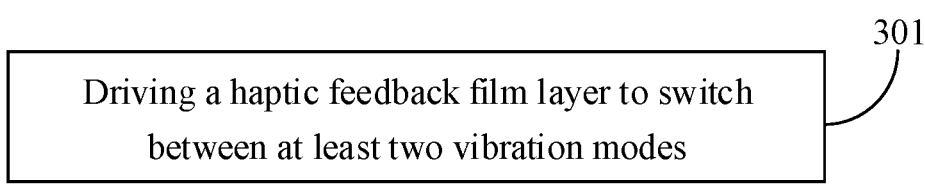
FIG. 3 is a flowchart of a haptic feedback method according to an embodiment of the present disclosure.

FIG. 3 is a flowchart of still another haptic feedback method according to an embodiment of the present disclosure. This embodiment is illustrated by taking an example in which the method is applied to the haptic feedback apparatus shown in FIG. 2. The haptic feedback method may include the following step.

In step 301, a haptic feedback film layer is driven to switch between at least two vibration modes.

The at least two vibration modes include a first vibration mode and a second vibration mode. In a first direction, a first position is different from a second position. The first position is a position of a first point when the haptic feedback film layer vibrates in the first vibration mode, and the second position is a position of the first point when the haptic feedback film layer vibrates in the second vibration mode. The first point is a point on the haptic feedback film layer. The first direction is a direction parallel to a reference plane. The reference plane is a surface of the haptic feedback film layer in a flat state.

In the embodiment of the present disclosure, the haptic feedback film layer may switch in a plurality of vibration modes under the control of a control instruction or may switch in the plurality of vibration modes in a preset fashion (the preset fashion may be set ahead in the driving module of the haptic feedback apparatus shown in FIG. 2).

It is to be understood that in the embodiment of the present disclosure, the first point of the haptic feedback film layer may be any point or a designated point on the haptic feedback film layer, and the position of the first point may be the position of the point in the space, and changes with the deformation of the haptic feedback film layer.

In summary, in the haptic feedback method according to the embodiment of the present disclosure, the point on the haptic feedback film layer can be displaced in the horizontal direction by enabling the haptic feedback film layer to vibrate in the at least two vibration modes, such that the horizontal friction of the touch body during touch can be adjusted, thereby enriching haptic simulation diversity and improving the haptic simulation effect.

The fashion of achieving haptic feedback based on whether the haptic feedback film layer vibrates or not is monotonous, and the haptic simulation effect is poorer. However, in the method according to the embodiment of the present disclosure, the sense of touch can be simulated by switching of the haptic feedback film layer among the plurality of vibration modes, and the haptic simulation effect is better.

Figure 4:
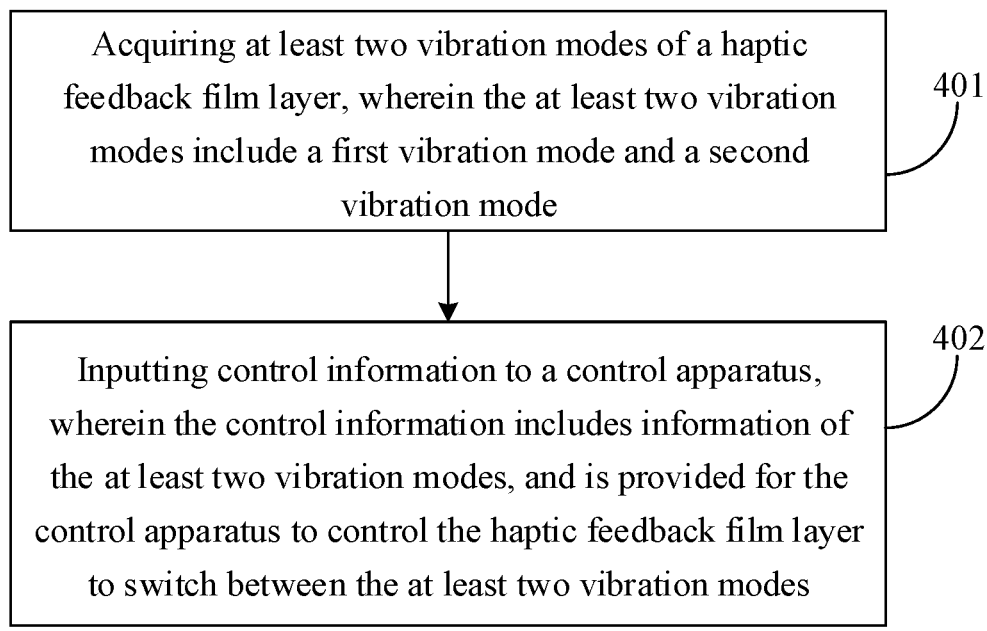
FIG. 4 is a flowchart of another haptic feedback method according to an embodiment of the present disclosure.

FIG. 4 is a flowchart of still another haptic feedback method according to an embodiment of the present disclosure. This embodiment is illustrated by taking an example in which the method is applied to a processing apparatus. The haptic feedback method may include the following steps.

In step 401, at least two vibration modes of a haptic feedback film layer are acquired, wherein the at least two vibration modes include a first vibration mode and a second vibration mode.

In a first direction, a first position is different from a second position. The first position is a position of a first point when the haptic feedback film layer vibrates in the first vibration mode, and the second position is a position of the first point when the haptic feedback film layer vibrates in the second vibration mode. The first point is a point on the haptic feedback film layer. The first direction is a direction parallel to the haptic feedback film layer in a flat state.

In step 402, control information is input to a control apparatus, wherein the control information includes information of the at least two vibration modes, and is provided for the control apparatus to control the haptic feedback film layer to switch between the at least two vibration modes.

In summary, in the haptic feedback method according to the embodiment of the present disclosure, the haptic feedback film layer can vibrate in the at least two vibration modes by determining the at least two vibration modes of the haptic feedback film layer and inputting the control information including the information of the at least two vibration modes to the control apparatus of the haptic feedback film layer. Thus, the point on the haptic feedback film layer can be displaced in the horizontal direction, such that the horizontal friction of the touch body during touch can be adjusted, thereby enriching the haptic simulation diversity and improving the haptic simulation effect.

Figure 5:
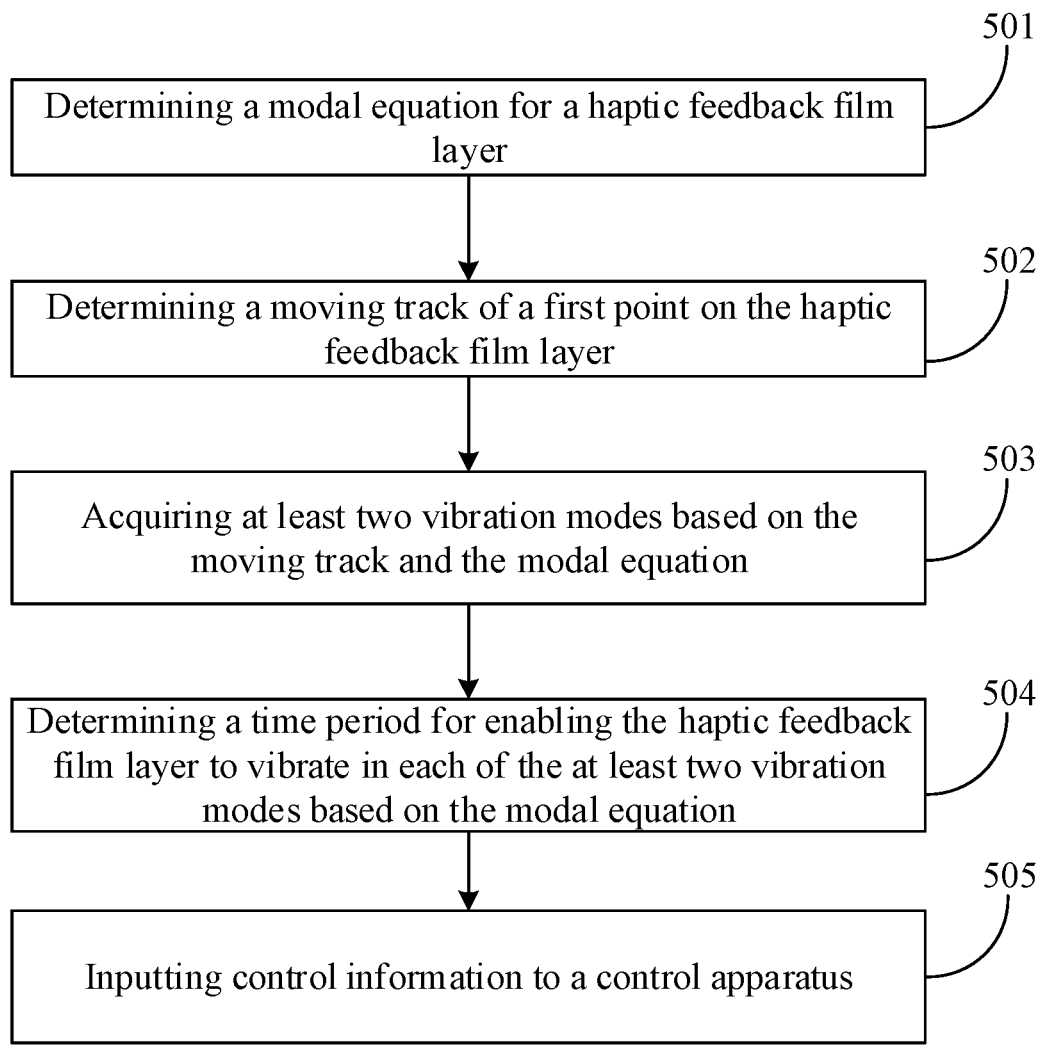
FIG. 5 is a flowchart of yet another haptic feedback method according to an embodiment of the present disclosure.

FIG. 5 is a flowchart of still another haptic feedback method according to an embodiment of the present disclosure. This embodiment is illustrated by taking an example in which the method is applied to a processing apparatus. The haptic feedback method may include the following steps.

In step 501, a modal equation for a haptic feedback film layer is determined.

Prior to applying the haptic feedback method according to the embodiment of the present disclosure, the modal equation for the haptic feedback film layer may be determined first. The modal equation is configured to reflect vibration characteristics of the haptic feedback film layer.

Optionally, the modal equation for the haptic feedback film layer may be acquired by performing a modal analysis (modal refers to a natural vibration characteristic of a mechanical structure, and the modal analysis is a method for studying the characteristic) on the haptic feedback film layer.

Exemplarily, the modal equation for the haptic feedback film layer may satisfy:

$$\underline{\omega}(x,t) = \underline{W}e^{j\omega t} = \sum_{n=1}^{\infty} W_n \phi_n(x) e^{j\omega t}.$$

Here, $\underline{\omega}(x, t)$ represents amplitude of a point x on the haptic feedback film layer at moment t, j is an imaginary unit, n is a positive integer, ω is an angular frequency, $\underline{W}e^{j\omega t}$ is a modal equation, including a real part and an imaginary part, $W_n$ is a modal participation factor, and $\phi_n(x)$ is a planned modal vibration mode factor.

In the embodiment of the present disclosure, the processing apparatus may be an apparatus for determining the vibration mode and other vibration parameters of the haptic feedback film layer. The apparatus may be a desktop computer, a notebook computer, a server, and the like, which is not limited in the embodiments of the present disclosure.

In step 502, a moving track of a first point on the haptic feedback film layer is determined.

The first point may be any point on the haptic feedback film layer, and the moving track of the point on the haptic feedback film layer at least has a part track having a certain length in the first direction. The first direction is a direction parallel to the haptic feedback film layer (being parallel to the haptic feedback film layer may be being parallel to the film layer of the haptic feedback film layer) in a flat state. In this case, the position of the first point on the haptic feedback film layer can move in the first direction.

The moving track of the first point may refer to the moving track of the first point when the haptic feedback film layer switches between the at least two vibration modes.

Optionally, the moving track of the first point under different vibration modes is a closed plane figure, and a plane (namely, the plane where the closed plane figure is) determined by the closed plane figure is parallel to the first direction. Exemplarily, the moving track is an ellipse.

Figure 6:
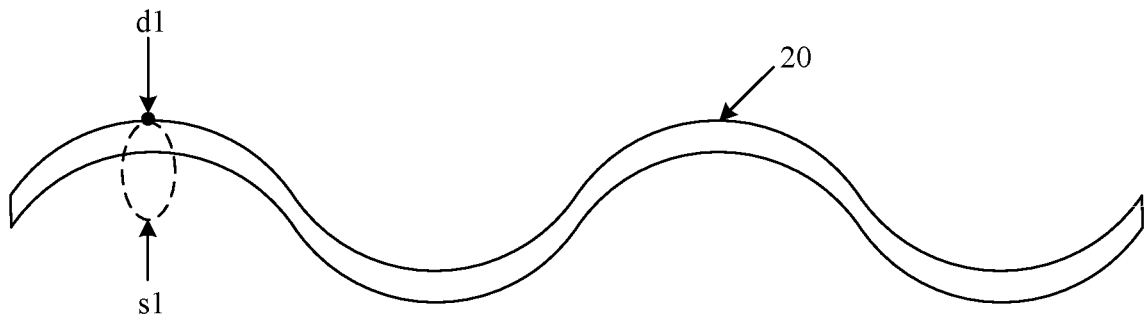
FIG. 6 is a schematic diagram of a moving track of a first point on a haptic feedback film layer in the embodiment shown in FIG. 5.

FIG. 6 shows a schematic diagram of a moving track of the first point d1 in the haptic feedback film layer 20. The first point d1 may move along an elliptical moving track s1 during the process of switching among different vibration modes.

It should be noted that in the method according to the embodiment of the present disclosure, one region of the haptic feedback film layer or the whole haptic feedback film layer may be controlled. Exemplarily, film layers of the haptic feedback film layer may include a plurality of regions, each of which is provided with a driving sub-module, and the driving sub-module in each region may be configured to control the vibration mode of the film layer in the respective region.

According to the method according to the embodiment of the present disclosure, one or more of the driving sub-modules may be controlled. For any one of the regions, the first point involved in step 502 may be any point in this region.

In step 503, the at least two vibration modes are acquired based on the moving track and the modal equation.

The at least two vibration modes of the haptic feedback film layer are acquired by solving the modal equation after the moving track of the first point on the haptic feedback film layer and the modal equation for the haptic feedback film layer are determined.

Exemplarily, by taking the modal equation shown in 401 as an example, the acquired equations for the two vibration modes (such as the first vibration mode and the second vibration mode) may include:

$\underline{W_1} = \underline{W}(x_1) = \underline{W_A}\phi_A(x_1)\underline{W_B}\phi_B(x_1)$; and $\underline{W_2} = \underline{W}(x_2) = \underline{W_A}\phi_A(x_2)\underline{W_B}\phi_B(x_2)$.

Here, $x_1$ and $x_2$ are both points on the haptic feedback film layer; $\underline{W_1} = \underline{W}(x_1)$ is a modal expression of point $x_1$ at different moments; and are the modal equation of the first vibration mode and the modal equation of the second vibration mode, respectively; $\phi_A(x_1)$ is a planned modal vibration mode factor of the point $x_1$ corresponding to $\underline{W_A}$; $\phi_B(x_1)$ is a planned modal vibration mode factor of the point $x_1$ corresponding to $\underline{W_B}$; $\phi_A(x_2)$ is a planned modal vibration mode factor of the point $x_2$ corresponding to $\underline{W_A}$; and $\phi_B(x_2)$ is a planned modal vibration mode factor of the point $x_2$ corresponding to $\underline{W_B}$.

Optionally, amplitude of the first vibration mode is the same as that of the second vibration mode, such that the sense of touch of a finger is relatively smooth, thereby improving the haptic feedback effect. A phase difference between the first vibration mode and the second vibration mode is 90 degrees, such that connection between the two vibration modes is gentler. That is, the moving track of the first point in the two vibration modes is more continuous, such that the sense of touch of the finger is improved, thereby improving the haptic feedback effect.

In the embodiment of the present disclosure, steps 501 to 503 are a process for determining the at least two vibration modes of the haptic feedback film layer through modal analysis.

In step 504, a time period for enabling the haptic feedback film layer to vibrate in each of the at least two vibration modes is determined based on the modal equation.

It takes a certain time period for the haptic feedback film layer to achieve vibration in one of the vibration modes under drive. This time period is related to physical parameters of the material of the haptic feedback film layer and the shape of the haptic feedback film layer. The time period enabling the haptic feedback film layer to achieve vibration in each of the at least two vibration modes determined in step 403 may be determined by performing a modal analysis on the haptic feedback film layer.

For example, a first time period for enabling the haptic feedback film layer to achieve vibration in the first vibration mode may be determined, and a second time period for enabling the haptic feedback film layer to achieve vibration in the second vibration mode may be determined.

In step 505, control information is input to a control apparatus.

The control information includes information of the at least two vibration modes, and is provided for the control apparatus to control the haptic feedback film layer to switch between the at least two vibration modes.

The control apparatus may be an apparatus for controlling the haptic feedback film layer, and the processing apparatus may send the information of the at least two acquired vibration modes to the control apparatus, such that the control apparatus can control the haptic feedback film layer. Exemplarily, the control apparatus may be a processor, and the processing apparatus may write the information of the at least two vibration modes into the processor.

In summary, in the haptic feedback method according to the embodiment of the present disclosure, the haptic feedback film layer can vibrate in the at least two vibration modes by determining the modal equation for the haptic feedback film layer and determining the at least two vibration modes of the haptic feedback film layer based on the modal equation and the moving track of the points. Thus, the point on the haptic feedback film layer can be displaced in the horizontal direction, such that the horizontal friction of the touch body during touch can be adjusted, thereby enriching the haptic simulation diversity and improving the haptic simulation effect.

Figure 7:
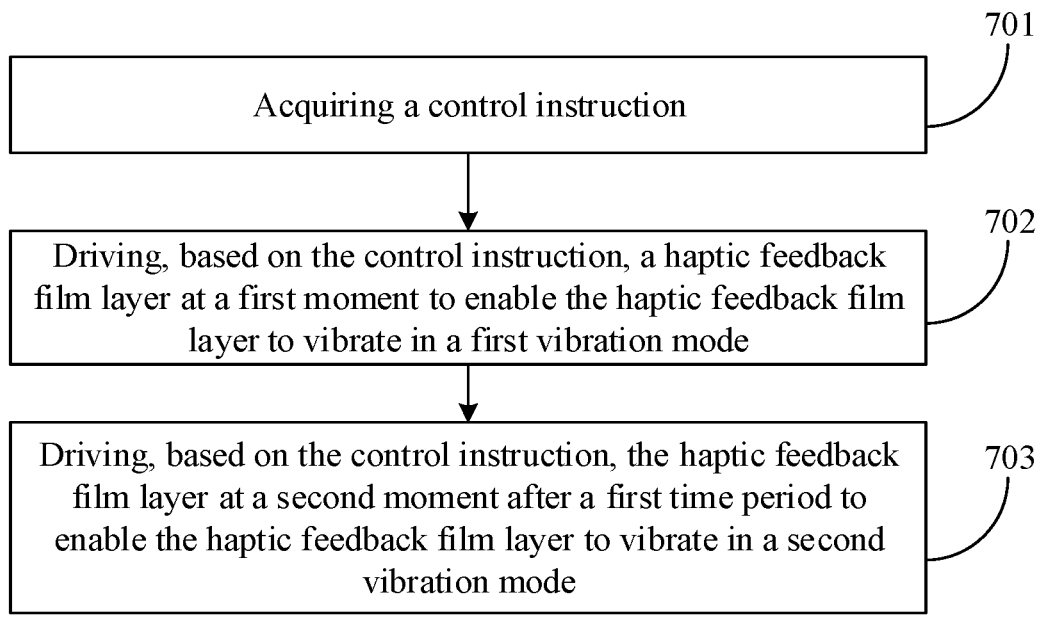
FIG. 7 is a flowchart of still another haptic feedback method according to an embodiment of the present disclosure.

FIG. 7 is a flowchart of still another haptic feedback method according to an embodiment of the present disclosure. This embodiment is illustrated by taking an example in which the method applied to the haptic feedback apparatus shown in FIG. 2. The haptic feedback method may include the following steps.

In step 701, a control instruction is acquired.

The control instruction may be configured to instruct the haptic feedback film layer to switch between the at least two vibration modes. In an exemplary embodiment, the control instruction may be an electrical signal whose frequency varies with time. The electrical signal has at least two frequencies. The at least two frequencies may be in one-to one correspondence to the at least two vibration modes of the haptic feedback film layer. Each of the frequencies is configured to drive the haptic feedback film layer to vibrate in the vibration mode corresponding to the frequency.

Figure 8:
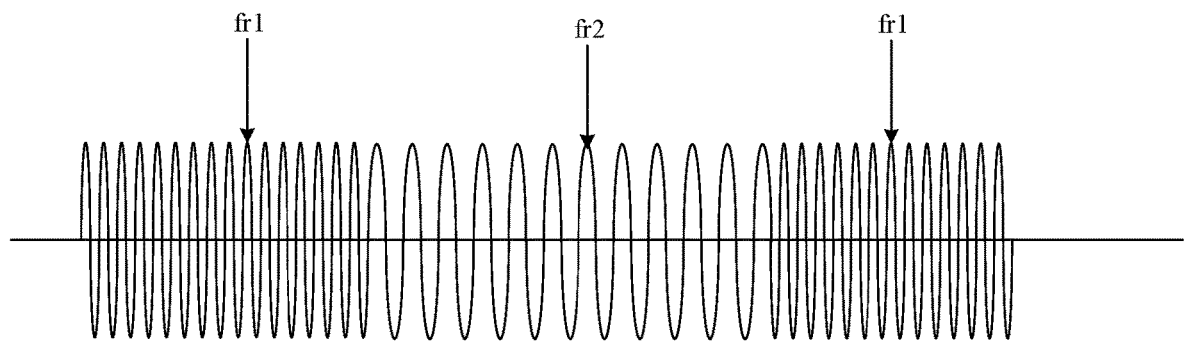
FIG. 8 is a schematic diagram of a control instruction in the embodiment shown in FIG. 7.

Exemplarily, as shown in FIG. 8, it is a schematic diagram of a control instruction. The control instruction switches between a frequency fr1 and a frequency fr2. Here, the frequency fr1 may correspond to the aforesaid first vibration mode, and is configured to drive the haptic feedback film layer to vibrate in the first vibration mode. The frequency fr2 may correspond to the aforesaid second vibration mode, and is configured to drive the haptic feedback film layer to vibrate in the second vibration mode.

The execution subject in the embodiment of the present disclosure may be a control component for the haptic feedback film layer, and the control component may be electrically connected to the driving component in the haptic feedback film layer. Exemplarily, when the haptic feedback film layer is applied to a terminal, the control component may be a processor in the terminal.

In step 702, the haptic feedback film layer is driven, based on the control instruction, at a first moment to enable the haptic feedback film layer vibrates in the first vibration mode.

The first moment may be a moment after the control instruction is acquired, and the haptic feedback film layer may be driven at this moment, to vibrate in the first vibration mode.

In step 703, the haptic feedback film layer is driven, based on the control instruction, at a second moment after a first time period to enable the haptic feedback film layer to vibrate in the second vibration mode.

At the second moment after the first time period, the haptic feedback film layer vibrates in the first vibration mode, and the haptic feedback film layer may be driven from the second moment, such that the haptic feedback film layer vibrates in the second vibration mode. In this way, the haptic feedback film layer may switch between different vibration modes more accurately, and the haptic feedback effect of the haptic feedback film layer is improved. The process of acquiring the first time period may be made reference to step 504 in the embodiment shown in FIG. 5, and is not repeated herein. In the embodiment of the present disclosure, the haptic feedback film layer may be driven immediately after the first time period from the first moment, or the haptic feedback film layer may be driven after a time period after the first time period, which is not limited in the embodiments of the present disclosure.

Figure 9:
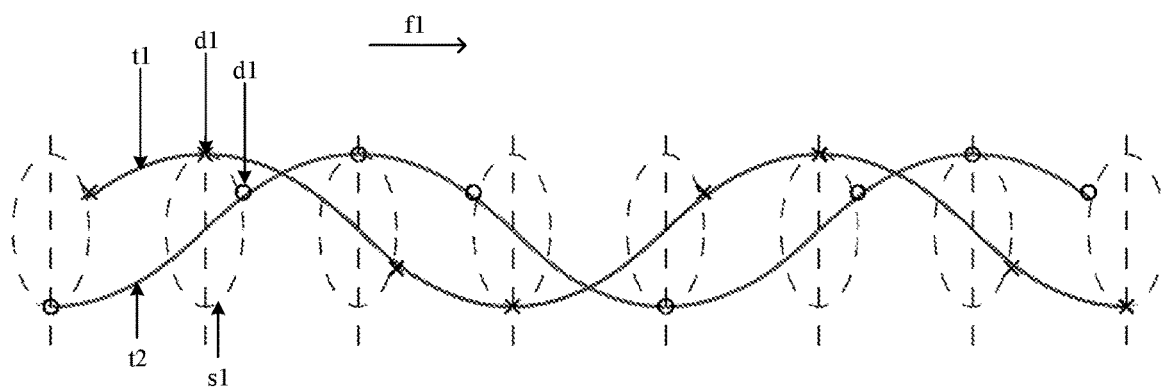
FIG. 9 is a schematic diagram of vibration of a haptic feedback film layer in the embodiment shown in FIG. 7.

Exemplarily, as shown in FIG. 9, it is a schematic diagram of vibration of the haptic feedback film layer at a second moment t1 and a third moment t2. It can be seen that at the second moment t1 after the first time period from the first moment, the haptic feedback film layer vibrates in the first vibration mode. The haptic feedback film layer may be driven from the second moment t1, to enable the haptic feedback film layer to vibrate in the second vibration mode at the third moment t2 after a second time period (a process of acquiring the second time period may be made reference to step 504 in the embodiment shown in FIG. 5, and is not repeated herein) from the second moment. A finger may be disposed above the haptic feedback film layer shown in FIG. 8. The first point d1 moves along an elliptical track s1. In the lower half of the elliptical track s1, since the haptic feedback film layer is relatively far away from the finger, the sense of touch of the finger is hardly affected. While in the upper half of the elliptical track s1, since the haptic feedback film layer is relatively close to the finger, the sense of touch of the finger is affected. In FIG. 9, the point "x" is the position of the point on the haptic feedback film layer when the haptic feedback film layer vibrates in the first vibration mode at the second moment t1, and the point "o" is the position of the point on the haptic feedback film layer when the haptic feedback film layer vibrates in the second vibration mode at the third moment t2.

It can be seen from FIG. 9 that the moving direction f1 of the first point d1 is right from the second moment t1 to the third moment t2. Thus, when the finger also moves to the right (that is, the moving directions of the finger and the first point are the same), the friction Ff felt by the finger is equal to Ft−Fp, that is, Ff=Ft−Fp, where Ff is the friction felt by the finger, Ft is a contact friction between the finger and the haptic feedback film layer, and Fp is the force of the first point d1 in the moving direction f1. That is, the force felt by the finger decreases. On the contrary, when the finger moves to the left (that is, the moving directions of the finger and the first point are opposite), the friction Ff felt by the finger is equal to Ft+Fp, that is, Ff=Ft+Fp. That is, the force felt by the finger increases. Therefore, the friction felt by the finger can be changed by adjusting the moving track of the first point d1.

Similarly, after step 703, the haptic feedback film layer may be driven at the third moment after the second time period, such that the haptic feedback film layer vibrates in the first vibration mode. The second time period is a time period for enabling the haptic feedback film layer to achieve vibration in the second vibration mode.

It should be noted that the finger mentioned in the embodiments of the present disclosure is a touch body that touches the haptic feedback film layer. However, the touch body that touches the haptic feedback film layer may also be a stylus or other objects, which is not limited in the embodiments of the present disclosure.

Optionally, driving the haptic feedback film layer to switch between the at least two vibration modes may include the followings.

1) The haptic feedback film layer is driven to switch between the at least two vibration modes by taking a point of the touch body in a touch region on the haptic feedback film layer as the first point and taking a moving direction of the touch body on the reference plane as the first direction when the touch body moves on the haptic feedback film layer.

That is, when the touch body on the haptic feedback film layer moves in one direction, the moving direction of the first point is the same as this direction.

Under this circumstance, the control instruction is generated after the touch body on the haptic feedback film layer moves (the touch body may continue moving). The haptic feedback film layer may be driven to switch between the at least two vibration modes based on the control instruction, such that the moving direction of the first point is the same as that of the touch body.

Here, the first point is within an orthographic projection of the touch body on the haptic feedback film layer. If a touch body moves in one direction on the haptic feedback film layer, the moving direction of the first point may be the same as this direction. It can be known from the above description that the friction felt by the touch body can be reduced in this way.

It should be noted that the moving direction of the touch body on the haptic feedback film layer may be obtained by an external device. For example, when the haptic feedback film layer is applied to a touch screen, the moving direction of the touch body may be determined by the touch screen. Or, the moving direction of the touch body may be determined by a camera component, which is not limited in the embodiments of the present disclosure.

2) The haptic feedback film layer is driven to switch between the at least two vibration modes by taking a point of the touch body in a touch region on the haptic feedback film layer as the first point and taking a direction opposite to the moving direction of the touch body on the reference plane as the first direction when the touch body moves on the haptic feedback film layer.

That is, when the touch body on the haptic feedback film layer moves in one direction, the moving direction of the first point is opposite to this direction.

In this case, the control instruction is generated after the touch body on the haptic feedback film layer moves (the touch body may continue moving). The haptic feedback film layer may be driven to switch between the at least two vibration modes based on the control instruction, such that the moving direction of the first point is opposite to that of the touch body. Here, in a certain period of time, if a touch body moves in one direction on the haptic feedback film layer, the moving direction of the first point may be opposite to this direction in this period of time. It can be known from the above description that the friction felt by the touch body can be increased in this way.

In the method according to the embodiment of the present disclosure, the points on the haptic feedback film layer may move in the direction parallel to the haptic feedback film layer. Therefore, a way for adjusting the friction of the touch body when touching the haptic feedback film layer is additionally provided, thereby improving the haptic feedback effect of the haptic feedback film layer.

It is to be understood that in the embodiment of the present disclosure is illustrated by taking the first and second vibration modes as examples. However, the haptic feedback film layer may also be driven to switch between more than two vibration modes, which is not limited in the embodiment of the present disclosure.

The embodiment of the present disclosure shows the way to switch between two vibration modes, but the haptic feedback film layer may also be controlled to switch between more than two vibration modes according to the method in the embodiments of the present disclosure. Here, switching between any two of at least three modes may be made reference to the above switching between the first vibration mode and the second vibration mode.

In summary, in the haptic feedback method according to the embodiment of the present disclosure, the haptic feedback film layer vibrates in the at least two vibration modes, such that the point on the haptic feedback film layer can be displaced in the horizontal direction. Therefore, the horizontal friction of the touch body during touch can be adjusted, thereby enriching the haptic simulation diversity and improving the haptic simulation effect.

Figure 10:
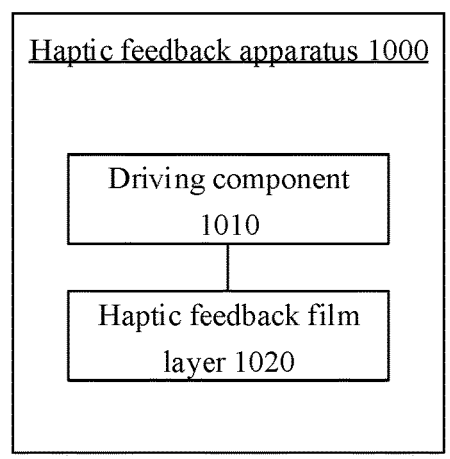
FIG. 10 is a block diagram of a haptic feedback apparatus according to an embodiment of the present disclosure.

FIG. 10 is a block diagram of a haptic feedback apparatus according to an embodiment of the present disclosure. The haptic feedback apparatus 1000 may include a driving component 1010 and a haptic feedback film layer 1020.

The driving component 1010 is configured to drive the haptic feedback film layer 1020 to switch between at least two vibration modes.

Here, the at least two vibration modes include a first vibration mode and a second vibration mode. In a first direction, a first position is different from a second position. The first position is a position of a first point when the haptic feedback film layer vibrates in the first vibration mode, and the second position is a position of the first point when the haptic feedback film layer vibrates in the second vibration mode. The first point is a point on the haptic feedback film layer. The first direction is a direction parallel to the haptic feedback film layer in a flat state.

In summary, the embodiment of the present disclosure provides a haptic feedback apparatus. The haptic feedback film layer vibrates in the at least two vibration modes, such that the point on the haptic feedback film layer can be displaced in the horizontal direction. Therefore, the horizontal friction of the touch body during touch can be adjusted, thereby enriching the haptic simulation diversity and improving the haptic simulation effect.

Optionally, the driving component 1010 is configured to: drive the haptic feedback film layer at a first moment to enable the haptic feedback film layer to vibrate in the first vibration mode; and drive the haptic feedback film layer at a second moment after a first time period to enable the haptic feedback film layer to vibrate in the second vibration mode. The first time period is longer than or equal to a time period for enabling the haptic feedback film layer to vibrate in the first vibration mode (that is, the first time period is longer than or equal to a first time period).

Optionally, the driving component 1010 is configured to: drive the haptic feedback film layer to switch between the at least two vibration modes by taking a point of a touch body in a touch region on the haptic feedback film layer as the first point and taking a moving direction of the touch body on the reference plane as the first direction when the touch body moves on the haptic feedback film layer.

Optionally, the driving component 1010 is configured to: drive the haptic feedback film layer to switch between the at least two vibration modes by taking a point of a touch body in a touch region on the haptic feedback film layer as the first point and taking a direction opposite to the moving direction of the touch body on the reference plane as the first direction when the touch body moves on the haptic feedback film layer.

Optionally, the haptic feedback film layer includes a plurality of regions, and the driving component 1010 is configured to: drive at least one region on the haptic feedback film layer to switch between the at least two vibration modes.

Optionally, the moving track of the first point is a closed plane figure when the haptic feedback film layer switches between the at least two vibration modes, and a plane determined by the closed plane figure is parallel to the first direction.

Optionally, the closed plane figure is an ellipse, and a minor axis of the ellipse is parallel to the first direction.

Optionally, amplitude of the first vibration mode and amplitude of the second vibration mode are the same, and a phase difference between the vibration mode and the second vibration mode is 90 degrees.

In summary, the embodiment of the present disclosure provides a haptic feedback apparatus. The haptic feedback film layer vibrates in the at least two vibration modes, such that the point on the haptic feedback film layer can be displaced in the horizontal direction. Therefore, the horizontal friction of the touch body during touch can be adjusted, thereby enriching the haptic simulation diversity and improving the haptic simulation effect.

Figure 11:
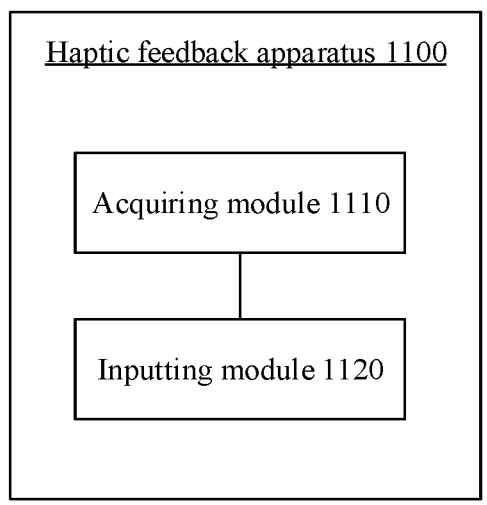
FIG. 11 is a block diagram of another haptic feedback apparatus according to an embodiment of the present disclosure.

FIG. 11 is a block diagram of a haptic feedback apparatus according to an embodiment of the present disclosure. The haptic feedback apparatus includes: an acquiring module 1110 and an inputting module 1120.

The acquiring module 1110 is configured to acquire at least two vibration modes of a haptic feedback film layer. The at least two vibration modes include a first vibration mode and a second vibration mode. A first position is different from a second position in a first direction, the first position is a position of a first point when the haptic feedback film layer vibrates in the first vibration mode, and the second position is a position of the first point when the haptic feedback film layer vibrates in the second vibration mode. The first point is a point on the haptic feedback film layer, the first direction is a direction parallel to a reference plane, and the reference plane is the surface of the haptic feedback film layer in a flat state.

The inputting module 1120 is configured to input control information to a control apparatus. The control information includes information of the at least two vibration modes, and is provided for the control apparatus to control the haptic feedback film layer to switch between the at least two vibration modes.

Optionally, the acquiring module 1110 is configured to: determine a moving track of the first point when the haptic feedback film layer switches between the at least two vibration modes, wherein the moving track is a closed plane figure, and a surface determined by the closed plane figure is parallel to the first direction; and determine the at least two vibration modes based on the moving track.

In summary, the embodiment of the present disclosure provides a haptic feedback apparatus. The haptic feedback film layer can vibrate in the at least two vibration modes after the at least two vibration modes of the haptic feedback film layer are determined. Thus, the point on the haptic feedback film layer can be displaced in the horizontal direction, such that the horizontal friction of the touch body during touch can be adjusted, thereby enriching the haptic simulation diversity and improving the haptic simulation effect.

According to another aspect of the present disclosure, a haptic feedback device is provided. The haptic feedback device includes: a haptic feedback film layer, a processor, and a memory. The memory stores at least one instruction, at least one program, a code set or an instruction set. The at least one instruction, the at least one program, the code set or the instruction set, when loaded and executed by the processor, causes the processor to implement the haptic feedback method as shown in FIG. 3 or FIG. 7.

The haptic feedback device may include various display devices with display functions, such as a mobile phone, a tablet computer, an all-in-one computer, a smart wearable device, and the like. The haptic feedback film layer may be disposed on a display screen of the display device, or may be disposed on a physical key (such as the home key), to improve the user experience of the display device.

According to another aspect of the present disclosure, a haptic feedback device is provided. The haptic feedback device includes: a processor, and a memory. The memory stores at least one instruction, at least one program, a code set or an instruction set. The at least one instruction, the at least one program, the code set or the instruction set, when loaded and executed by the processor, causes the processor to implement the haptic feedback method as shown in FIG. 4.

The haptic feedback device may be a desktop computer, a notebook computer, a server, or the like.

According to another aspect of the present disclosure, a non-transitory computer storage medium is provided. The non-transitory computer storage medium stores at least one instruction, at least one program, a code set or an instruction set, and the at least one instruction, the at least one program, the code set or the instruction set, when loaded and executed by a processor, causes the processor to implement the aforesaid haptic feedback methods.

According to another aspect of the present disclosure, a computer program product or computer program is provided. The computer program product or computer program includes a computer instruction stored in a non-transitory computer storage medium. The computer instruction, when red by a processor of a computer device from the non-transitory computer storage medium and executed by the processor, causes the computer device to implement the aforesaid haptic feedback methods.

The terms "first", "second" and "third" used in the present disclosure are merely for description, but do not denote or imply any relative importance. The term "a plurality of" refers to two or more, unless otherwise expressly specified.

In the embodiments of the present disclosure, it should be understood that the disclosed apparatuses and methods may be implemented in other ways. For example, the embodiments of the apparatus described above are merely illustrative. For instance, the division of units is only a logical function division. In practice, the units may be divided in other manners. For instance, multiple units or modules may be combined or may be integrated into another system, or some features may be omitted or not implemented. In addition, displayed or discussed mutual coupling, direct coupling or communication connection may be indirect coupling or communication connection by some interfaces, devices or units, and may be electrical, mechanical, or in other fashions.

The units described as separate components may be or may not be physically separated, and components displayed as units may be or may not be physical units. That is, the components can be disposed at one place, or distributed in multiple network units. Part or all of the units may be selected according to actual needs, to achieve the objectives of the solutions of the embodiments.

It should be understood by those skilled in the art that all or part of the steps in the above embodiments may be completed by hardware or by relevant hardware instructed by a program. The program may be stored in a computer-readable storage medium such as a read only memory, a magnetic disk, an optical disc, or the like.

The foregoing descriptions are merely optional embodiments of the present disclosure, and are not intended to limit the present disclosure. Any variations, equivalent substitutions, modifications and the like that fall within the spirit and principle of the present disclosure shall be included in the protection scope of the present disclosure.

What is claimed is:

1. A haptic feedback method, comprising:
   driving a haptic feedback film layer to switch between at least two vibration modes,
   wherein the at least two vibration modes comprise a first vibration mode and a second vibration mode, and a first position is different from a second position in a first direction, wherein the first position is a position of a first point when the haptic feedback film layer is driven by a first frequency and vibrates in the first vibration mode, the second position is a position of the first point when the haptic feedback film layer is driven by a second frequency and vibrates in the second vibration mode, the first point being a point on the haptic feedback film layer, and the first direction is a direction parallel to a reference plane, the reference plane being a surface of the haptic feedback film layer in a flat state,
   wherein the first frequency is different from the second frequency,
   a moving track of the first point is a closed plane figure when the haptic feedback film layer switches between the at least two vibration modes, and a plane determined by the closed plane figure is parallel to the first direction, and the closed plane figure is an ellipse, and a minor axis of the ellipse is parallel to the first direction.

2. The method according to claim 1, wherein driving the haptic feedback film layer to switch between the at least two vibration modes comprises:
   driving the haptic feedback film layer at a first moment to enable the haptic feedback film layer to vibrate in the first vibration mode; and
   driving the haptic feedback film layer at a second moment after a first time period to enable the haptic feedback film layer to vibrate in the second vibration mode,
   wherein the first time period is longer than or equal to a time period for enabling the haptic feedback film layer to vibrate in the first vibration mode.

3. The method according to claim 1, wherein driving the haptic feedback film layer to switch between the at least two vibration modes comprises:
   driving the haptic feedback film layer to switch between the at least two vibration modes by taking a point of a touch body in a touch region on the haptic feedback film layer as the first point and taking a moving direction of the touch body on the reference plane as the first direction, when the touch body moves on the haptic feedback film layer.

4. The method according to claim 1, wherein driving the haptic feedback film layer to switch between the at least two vibration modes comprises:
   driving the haptic feedback film layer to switch between the at least two vibration modes by taking a point of a touch body in a touch region on the haptic feedback film layer as the first point and taking a direction opposite to a moving direction of the touch body on the reference plane as the first direction, when the touch body moves on the haptic feedback film layer.

5. The method according to claim 1, wherein the haptic feedback film layer comprises a plurality of regions, and driving the haptic feedback film layer to switch between the at least two vibration modes comprises:
   driving at least one region in the haptic feedback film layer to switch between the at least two vibration modes.

6. The method according to claim 1, wherein amplitude of the first vibration mode and amplitude of the second vibration mode are the same, and a phase difference between the first vibration mode and the second vibration mode is 90 degrees.

7. The method according to claim 1, wherein driving the haptic feedback film layer to switch between the at least two vibration modes comprises:
   driving the haptic feedback film layer to switch between the at least two vibration modes based on a control instruction, wherein the control instruction comprises an electrical signal whose frequency varies with time, and the electrical signal has at least two frequencies in one-to-one correspondence to the at least two vibration modes of the haptic feedback film layer.

8. A haptic feedback device, comprising: a haptic feedback film layer, a processor, and a memory storing a program therein, wherein the program, when loaded and executed by the processor, causes the processor to implement the haptic feedback method according to claim 1.

9. A non-transitory computer storage medium storing a program therein, wherein the program, when executed by a processor, causes the processor to implement the haptic feedback method according to claim 1.

10. A haptic feedback method, comprising:
    acquiring at least two vibration modes of a haptic feedback film layer, wherein the at least two vibration modes comprise a first vibration mode and a second vibration mode, and a first position is different from a second position in a first direction, wherein the first position is a position of a first point when the haptic feedback film layer is driven by a first frequency and vibrates in the first vibration mode, the second position is a position of the first point when the haptic feedback film layer is driven by a second frequency and vibrates in the second vibration mode, the first point being a point on the haptic feedback film layer, and the first direction is a direction parallel to the haptic feedback film layer in a flat state, wherein the first frequency is different from the second frequency; and
    inputting control information to a control apparatus, wherein the control information comprises information of the at least two vibration modes, and is provided for the control apparatus to control the haptic feedback film layer to switch between the at least two vibration modes,
    wherein a moving track of the first point is a closed plane figure when the haptic feedback film layer switches between the at least two vibration modes, and a plane determined by the closed plane figure is parallel to the first direction, and the closed plane figure is an ellipse, and a minor axis of the ellipse is parallel to the first direction.

11. The method according to claim 10, wherein acquiring the at least two vibration modes of the haptic feedback film layer comprises:
    determining a moving track of the first point when the haptic feedback film layer switches between the at least two vibration modes, wherein the moving track is a closed plane figure, and a plane determined by the closed plane figure is parallel to the first direction; and
    determining the at least two vibration modes based on the moving track.

12. A haptic feedback device, comprising: a processor, and a memory storing a program therein, wherein the program, when loaded and executed by the processor, causes the processor to implement the haptic feedback method according to claim 10.

13. A non-transitory computer storage medium storing a program therein, wherein the program, when executed by a processor, causes the processor to implement the haptic feedback method according to claim 10.

14. A haptic feedback apparatus, comprising: a haptic feedback film layer and a driving component,
wherein the driving component is configured to drive a haptic feedback film layer to switch between at least two vibration modes,
wherein the at least two vibration modes comprise a first vibration mode and a second vibration mode, and a first position is different from a second position in a first direction, wherein the first position is a position of a first point when the haptic feedback film layer is driven by a first frequency and vibrates in the first vibration mode, the second position is a position of the first point when the haptic feedback film layer is driven by a second frequency and vibrates in the second vibration mode, the first point being a point on the haptic feedback film layer, and the first direction is a direction parallel to a reference plane, the reference plane being a surface of the haptic feedback film layer in a flat state,
wherein the first frequency is different from the second frequency,
a moving track of the first point is a closed plane figure when the haptic feedback film layer switches between the at least two vibration modes, and a plane determined by the closed plane figure is parallel to the first direction, and the closed plane figure is an ellipse, and a minor axis of the ellipse is parallel to the first direction.

15. The apparatus according to claim 14, wherein the driving component is configured to:
drive the haptic feedback film layer at a first moment to enable the haptic feedback film layer to vibrate in the first vibration mode; and
drive the haptic feedback film layer at a second moment after a first time period to enable the haptic feedback film layer to vibrate in the second vibration mode,
wherein the first time period is longer than or equal to a time period for enabling the haptic feedback film layer to vibrate in the first vibration mode.

16. The apparatus according to claim 15, wherein the driving component is configured to:
drive the haptic feedback film layer to switch between the at least two vibration modes by taking a point of a touch body in a touch region on the haptic feedback film layer as the first point and taking a moving direction of the touch body on the reference plane as the first direction, when the touch body moves on the haptic feedback film layer.

17. The apparatus according to claim 15, wherein the driving component is configured to:
drive the haptic feedback film layer to switch between the at least two vibration modes by taking a point of a touch body in a touch region on the haptic feedback film layer as the first point and taking a direction opposite to a moving direction of the touch body on the reference plane as the first direction, when the touch body moves on the haptic feedback film layer.

18. The apparatus according to claim 17, wherein the haptic feedback film layer comprises a plurality of regions, and the driving component is configured to:
drive at least one region in the haptic feedback film layer to switch between the at least two vibration modes.

* * * * *